(No Model.)
E. HART.
APPARATUS FOR DISTILLING ACIDS.
No. 603,508. Patented May 3, 1898.
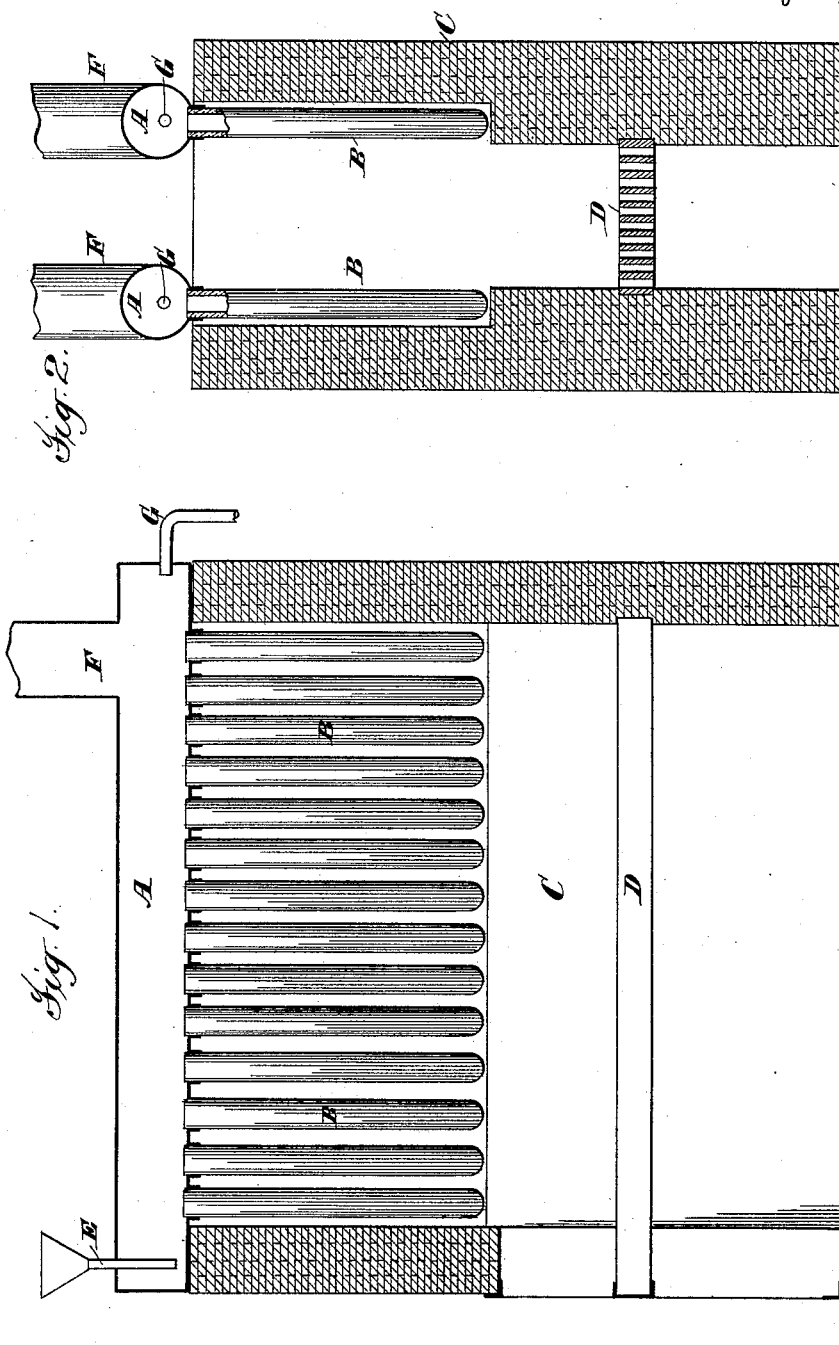

UNITED STATES PATENT OFFICE.

EDWARD HART, OF EASTON, PENNSYLVANIA, ASSIGNOR TO THE BAKER & ADAMSON CHEMICAL COMPANY, OF SAME PLACE.

APPARATUS FOR DISTILLING ACIDS.

SPECIFICATION forming part of Letters Patent No. 603,508, dated May 3, 1898.

Application filed June 16, 1896. Serial No. 595,768. (No model.)

*To all whom it may concern:*

Be it known that I, EDWARD HART, a citizen of the United States, residing at Easton, county of Northampton, and State of Pennsylvania, have invented certain new and useful Improvements in Distillation Apparatus for Acids and other Substances, fully described and represented in the following specification and the accompanying drawings, forming a part of the same.

The object of the present invention is to provide an efficient apparatus for the continuous distillation of acids and other corrosive substances either to make acids or other substances by condensing the vapors thus distilled over or to concentrate the undistilled portion by distilling over the more volatile constituents. For this purpose it is necessary that a large heating-surface should be provided, and the danger of breakage of any material that can be used and expense of repair have heretofore been found prohibitory of the commercial use of distillation apparatus for such acids.

The present invention provides a simple, efficient, and economical apparatus for this purpose employing for the exposure of the acid to the furnace heat comparatively small tubes, preferably of glass and similar to the common test-tubes, so that a large heating-surface is secured. The small amount of acid contained in each of said tubes reduces to a minimum the danger of fracture, and in case of breakage of any one of the tubes it may readily be removed and replaced by another without the great cost incident to the reconstruction of the apparatus if a continuous holder for the acid be employed.

A further important feature of the present invention as applied to making acids by condensing the vapors distilled over from impure materials consists in constructing the apparatus so that the acid is only partially evaporated or distilled and the undistilled residue is drawn off, the result being that the impurities collected in this residue will not distil over or form incrustations in the apparatus.

For a full understanding of the invention a detailed description of a construction embodying all the features of the same in their preferred form will now be given in connection with the accompanying drawings, forming a part of this specification, and the features forming the invention then specifically pointed out in the claims.

In the drawings, Figure 1 is a longitudinal section of an apparatus employing two rows of acid-tubes on opposite sides of the furnace, the section being taken through one of the receivers with which the tubes connect. Fig. 2 is a cross-section of the same.

A A are the main boiler-tubes or acid-receivers, which are preferably made of stoneware or may be of any other suitable material, provided with convenient means for attachment of the acid-tubes. The acid-tubes B are preferably of glass, and for this purpose the common glass test-tubes are admirably adapted. A row of these acid-tubes is set into each of the receivers A, so as to depend therefrom, receiving acid through their open ends from receivers A and being supported by the latter within a furnace C above and on opposite sides of the grate D, which furnace may be of any suitable construction. Acid is delivered to each of the tubes A in a continuous stream through the inlet-funnel pipe E, and at the opposite ends of the tubes A are the vertical exit-pipes F for the vapor. As above stated, the acid is preferably only partially distilled or evaporated and the undistilled residue with the impurities pass off from each of the receivers A through small pipes G, which may deliver this residue as desired.

It will be seen that this construction provides a very simple distillation apparatus for acid and similar corrosive substances in which a very large heating-surface is secured, while breakage of one of the acid-tubes B necessitates only the removal of the broken tube and substitution of another, which may readily be done by removing from the furnace the receiver A with its attached row of tubes B, and the impurities are removed, so as to avoid distilling them over or forming incrustations within the apparatus.

What I claim is—

1. A distillation apparatus having a receiver, a series of small distillation-tubes depending from said receiver and providing extended heating-surfaces, said tubes being closed at the bottom but open at the top to receive liquid from the receiver, a vapor-outlet at the top of the receiver, and an outlet from the receiver for the undistilled liquid, substantially as described.

2. A distillation apparatus for acids and other corrosive substances having a receiver, and a series of small distillation-tubes of fragile material closed at the bottom and depending from and having their open ends removably connected to said receiver, substantially as described.

3. A distillation apparatus for acids and other corrosive substances having a receiver, a series of small distillation-tubes of fragile material closed at the bottom and depending from and having their open ends removably connected to said receiver, a vapor-outlet at the top of the receiver, and an outlet from the receiver for the undistilled liquid, substantially as described.

4. In a distillation apparatus, the combination with the main boiler-tube or receiver, A, of the small tubes B arranged along said receiver and depending therefrom, an inlet at one end of the receiver for the liquid to be distilled, an outlet G for the undistilled liquid at the opposite end of the receiver, and a vapor-outlet, substantially as described.

5. In a distillation apparatus, the combination with the main boiler-tube or receiver A, of the small tubes B of fragile material arranged along said receiver and depending therefrom and having their open ends removably connected to the receiver, an inlet at one end of the receiver for the liquid to be distilled, an outlet G for the undistilled liquid at the opposite end of the receiver, and a vapor-outlet, substantially as described.

In testimony whereof I have hereunto set my hand in the presence of two subscribing witnesses.

EDWARD HART.

Witnesses:
GEO. E. KRESSLER,
J. RAY ABEL.